(12) United States Patent
Butler et al.

(10) Patent No.: US 7,665,286 B2
(45) Date of Patent: Feb. 23, 2010

(54) MULCH DECK ATTACHMENT BAFFLE SYSTEM

(76) Inventors: Walter R. Butler, 18901 SW. 63rd St., Southwest Ranches, FL (US) 33332; Dena R. Butler, 18901 SW. 63rd St., Southwest Ranches, FL (US) 33332

( * ) Notice: Subject to any disclaimer, the term of this patent is extended or adjusted under 35 U.S.C. 154(b) by 0 days.

(21) Appl. No.: 12/098,045

(22) Filed: Apr. 4, 2008

(65) Prior Publication Data

US 2009/0249764 A1  Oct. 8, 2009

(51) Int. Cl.
*A01D 67/00* (2006.01)
(52) U.S. Cl. ...................................... 56/320.1
(58) Field of Classification Search ........... 56/320.1, 56/320.2, 6, 13.5, 13.6, 17.4, 17.5, DIG. 22
See application file for complete search history.

(56) References Cited

U.S. PATENT DOCUMENTS

| | | | | | |
|---|---|---|---|---|---|
| 2,547,328 | A | * | 4/1951 | Koch et al. ................. | 56/12.9 |
| 2,701,943 | A | * | 2/1955 | Johnson ..................... | 56/11.4 |
| 2,719,396 | A | * | 10/1955 | Morris et al. .............. | 56/12.2 |
| 2,802,327 | A | * | 8/1957 | Thelander .................. | 56/17.4 |
| 2,956,386 | A | * | 10/1960 | Niemann .................... | 56/13.8 |
| 2,992,524 | A | * | 7/1961 | Stabnau ..................... | 56/320.1 |
| 3,032,957 | A | * | 5/1962 | Boyer ........................ | 56/17.4 |
| 3,049,853 | A | * | 8/1962 | Horner et al. .............. | 56/13.4 |
| 3,057,140 | A | * | 10/1962 | Ridenour et al. .......... | 56/10.5 |
| 3,134,212 | A | * | 5/1964 | Gary ......................... | 56/16.4 R |
| 3,188,787 | A | * | 6/1965 | Weiland ..................... | 56/16.5 |
| 3,242,660 | A | * | 3/1966 | Gary ......................... | 56/13.8 |
| 3,828,533 | A | * | 8/1974 | Finneran ................... | 56/320.2 |
| 4,226,074 | A | * | 10/1980 | Mullet et al. .............. | 56/320.2 |
| 4,890,446 | A | * | 1/1990 | Israel ........................ | 56/17.5 |
| 5,191,756 | A | * | 3/1993 | Kuhn ......................... | 56/17.5 |
| 5,267,429 | A | * | 12/1993 | Kettler et al. .............. | 56/295 |
| 5,337,545 | A | | 8/1994 | Butler | |
| 5,457,947 | A | * | 10/1995 | Samejima et al. .......... | 56/16.7 |
| 5,765,346 | A | * | 6/1998 | Benter et al. .............. | 56/2 |
| 5,845,475 | A | * | 12/1998 | Busboom et al. ........... | 56/320.1 |

(Continued)

OTHER PUBLICATIONS

Exmark Manufacturing Co., Inc., "TRITON Out There Working. No Excuses", Catalog, (2005), pp. 1-2 and 7.

(Continued)

*Primary Examiner*—Árpád Fábián-Kovács
(74) *Attorney, Agent, or Firm*—Christopher & Weisberg, P.A.

(57) ABSTRACT

A mulch deck attachment for reducing grass clippings into particles of mulch which return nutrients back to the soil. The mulch deck attachment of the present invention may be coupled to a lawnmower and may include one or more rotating blades coupled to the mulch deck attachment. A first baffle may be coupled to the mulch deck attachment and may define one or more apertures. The first baffle may also at least be partially disposed within a turning radius defined by the one or more rotating blades. A second baffle may be coupled to the mower deck and may be disposed between the first baffle and the leading edge. One or more third baffles may also be coupled to the mower deck and may be partially disposed around a circumference defined by the one or more rotating blades. A fourth baffle may be coupled to the rear portion of the mulch deck attachment and may be partially disposed about the rotating blade.

7 Claims, 8 Drawing Sheets

U.S. PATENT DOCUMENTS

| | | | | |
|---|---|---|---|---|
| 5,894,717 | A * | 4/1999 | Yamashita et al. | 56/320.1 |
| 5,987,863 | A * | 11/1999 | Busboom et al. | 56/320.1 |
| 6,038,840 | A * | 3/2000 | Ishimori et al. | 56/13.3 |
| 6,062,013 | A * | 5/2000 | Wolske | 56/295 |
| 6,269,621 | B1 * | 8/2001 | Fischier et al. | 56/255 |
| 6,360,517 | B1 * | 3/2002 | Ishimori et al. | 56/320.1 |
| 6,681,553 | B2 * | 1/2004 | Ferree et al. | 56/320.1 |
| 6,779,328 | B2 * | 8/2004 | Buss et al. | 56/320.1 |
| 6,782,684 | B2 * | 8/2004 | Buss et al. | 56/320.2 |
| 6,848,246 | B2 * | 2/2005 | Samejima et al. | 56/320.2 |
| 6,892,519 | B2 * | 5/2005 | Sugden et al. | 56/320.1 |
| 6,996,962 | B1 * | 2/2006 | Sugden et al. | 56/17.4 |
| 7,062,898 | B2 * | 6/2006 | Sarver et al. | 56/320.1 |
| 7,065,946 | B2 * | 6/2006 | Boeck et al. | 56/320.1 |
| 7,093,415 | B2 * | 8/2006 | Kallevig et al. | 56/320.2 |
| 7,299,613 | B2 * | 11/2007 | Samejima et al. | 56/320.1 |
| 7,458,199 | B2 * | 12/2008 | Sarver et al. | 56/320.1 |
| 2004/0237492 | A1 * | 12/2004 | Samejima et al. | 56/320.1 |
| 2004/0255567 | A1 * | 12/2004 | Kallevig et al. | 56/320.2 |
| 2005/0279072 | A1 * | 12/2005 | Sarver et al. | 56/320.1 |
| 2006/0230735 | A1 * | 10/2006 | Samejima et al. | 56/320.2 |
| 2008/0047249 | A1 * | 2/2008 | Davis et al. | 56/320.2 |

OTHER PUBLICATIONS

Toro, "Innovation and Design: a Complete Look at Toro", RED Magazine, pp. 1-2, 15-16, 2004.

Scag, "2006 Commercial Mower Catalog", (Copyright 2005), pp. 4-5, 8-9.

Kubota, "Kubota Diesel Zero-Turn Mower", Catalog #2232-01, (Dec. 2006), pp. 1-16.

Turf: For Turf Care Professionals, "Super Shrubs: What it takes to make 'em great", vol. 18, Issue 10, pp. B18, B22-25.

* cited by examiner

MULCH DECK ATTACHMENT BAFFLE SYSTEM

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to mulching decks and more specifically to a mulch deck attachment device that reduces grass clippings into tiny particles of mulch.

BACKGROUND OF THE INVENTION

Mower decks presently on the market are primarily designed to expel grass and leaves, known as clippings, either to the ground or to a catcher, so that they may be removed from the lawn. If the clippings are left on top of the grass they not only look unsightly, but can be damaging to a lawn by creating thatch in the turf. Alternatively, removing all of the clippings may create a more aesthetically pleasing lawn, but ultimately removes organic nutrients that may be utilized by grass and plants for future growth.

As an alternative to conventional mowers, mulching mowers can reduce expenses and decrease waste. Mulching is a process for maintaining an even soil temperature, controlling weeds, retaining water in the soil, and adding organic material and nutrients to the soil through the gradual breakdown of the mulch material. When clippings from a mower are sufficiently reduced in size to small particles, they may serve as a mulching agent, thereby reducing waste, expenses, and inefficiencies associated with conventional lawn mowing.

Past methods to improve mower deck performance have been included the use of baffles to speed up the process of a more complete discharge. These mower decks primarily discharge clippings to a farther distance to spread out the clippings more evenly. However, this process creates possible hazards when rocks, bottles, or other debris are hidden in the lawn. Moreover, these conventional mowers leave clippings that are large in size and clumped together near the chute area. This process ultimately leaves unsightly and damaging windrows, which are rows of cut grass clumped together. Additionally, many high portioned motors associated with conventional mowers expel air out from the front portion of the mower deck in an uncontrolled manner, creating dusty and uncomfortable, if not dangerous conditions for the mower operator.

Efforts have been made to convert conventional mowers that are designed to expel clippings into mulching mowers by using solid plates to close off the mower deck opening. However, this process often clogs the mower deck with debris and impedes cutting performance in adverse conditions. These types of conventional mulching mowers use rotary blades to create suction from the ground to the bottom of the blade thereby raising the grass to a vertical cutting position. This suction is achieved by the high lift wing on the end of the cutter blade as it spins. As the blade spins, a high pressure area is created above the blade that facilitates the expulsion of clippings out from the mower deck. As such, blocking the discharge inhibits this process thereby reducing the efficiency of the mower.

Given the inadequacies of the prior art mowers, it would be desirable to provide a high performance mulch deck attachment capable of reducing clippings to a manageable size without clogging the mower or creating uncomfortable driving conditions for the mower operator.

SUMMARY OF THE INVENTION

The present invention advantageously provides for an environmentally friendly and efficient mulch deck attachment having a system of one or more baffles to facilitate the reduction of grass clippings into tiny particles of mulch which return nutrients back to the soil.

The mulch deck attachment of the present invention may be coupled to a lawnmower and may include one or more rotating blades coupled to the mulch deck attachment. The mulch deck attachment defines a front portion, a rear portion, and an opening. A first baffle may be coupled to the mulch deck attachment and may be partially disposed within a turning radius defined by the one or more rotating blades.

In an alternative embodiment of the present invention, the mulch deck attachment may include one or more rotating blades coupled to the mower deck. A baffle is coupled to the mower deck, the baffle defining a first portion, a second portion, and a third portion. A width of the first portion may be greater than a width of the second portion. The third portion may also define a plurality of apertures.

In still another embodiment of the present invention, the mulch deck attachment may include a baffle system. The mulch deck attachment may define a front portion, a rear portion, and an opening. A first baffle may be coupled to the mulch deck. A second baffle may be coupled to the mulch deck and may be disposed proximate the front portion of the mulch deck attachment. One or more third baffles may also be coupled to the mulch deck being disposed between the first and second baffles.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides for a mulch deck attachment for use with a lawnmower. The mulch deck attachment includes one or more rotating blades and including one or more baffles to facilitate the reduction of grass clippings into tiny particles of mulch.

Figure 1:
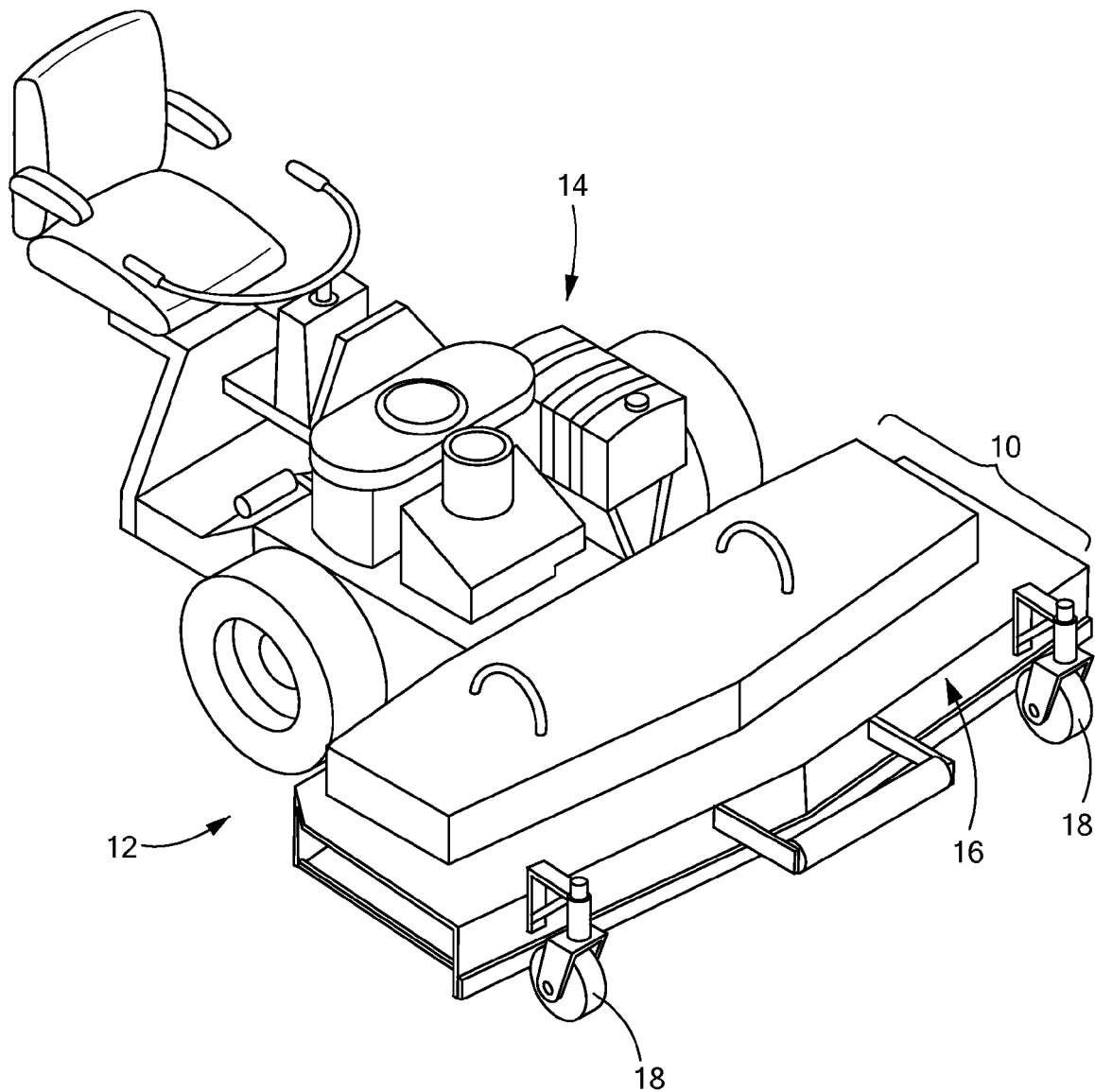
FIG. 1 is a perspective view of an embodiment of the present invention.
Figure 2:
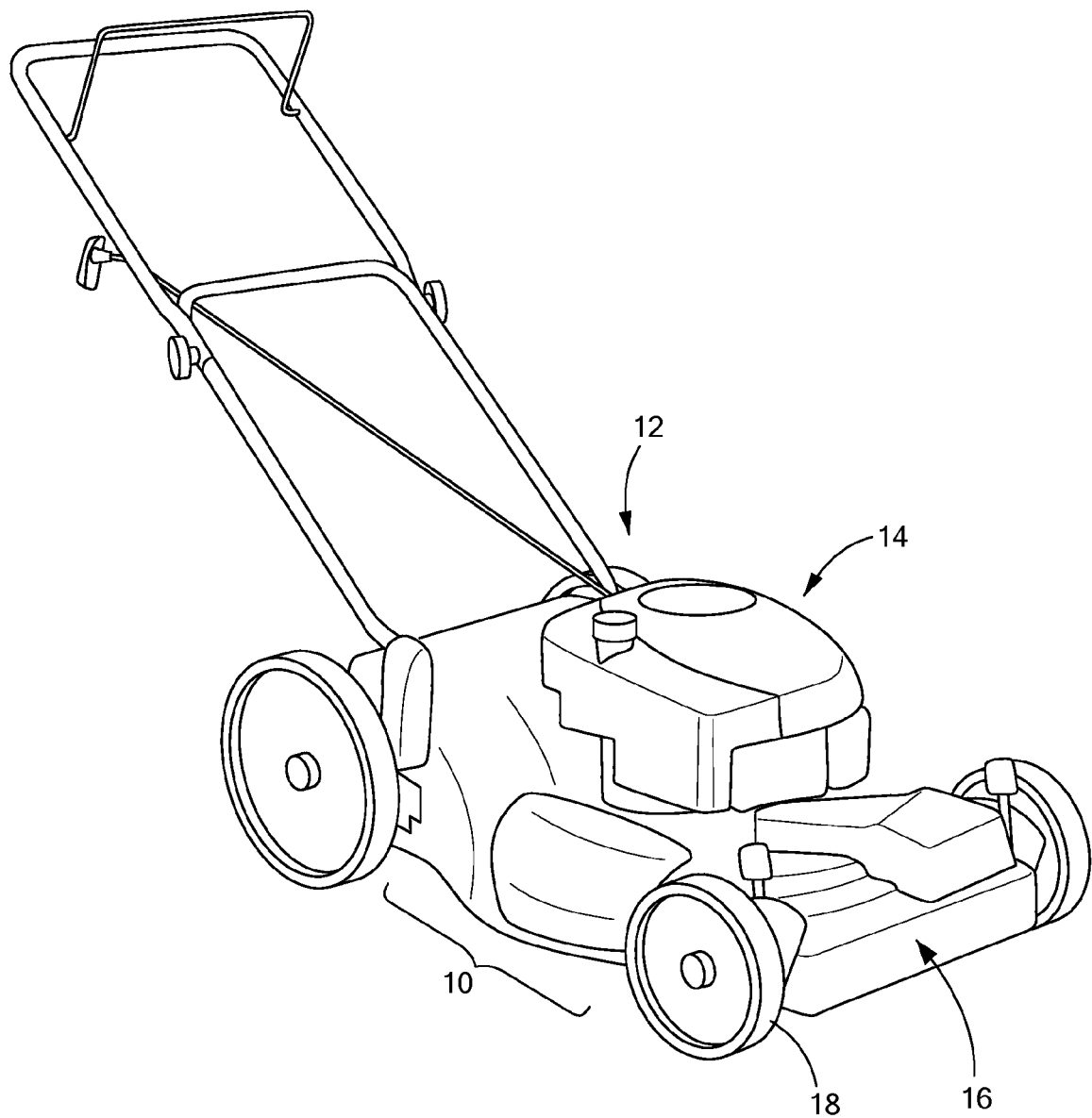
FIG. 2 is a perspective view of an alternative embodiment of the present invention.

Referring now to the drawing figures in which like reference designators refer to like elements there is shown in FIG. 1 and FIG. 2 a device constructed in accordance with the principles of the present invention and designated generally as 10. The mulch deck attachment 10 may be coupled to a lawnmower 12, which may be any model or style of lawnmower known in the art, and may include a motor 14 as a propulsion source. The mulch deck attachment 10 may be sufficiently sized and proportioned to accommodate the dimensions of the lawnmower 12. The mulch deck attachment 10 may include a cover 16, which may shield the mower operator from discharge of grass clippings and dust created from operation of the lawnmower 12, and which may further serve to couple various components to the mulch deck attachment 10. The mulch deck attachment 10 may further be coupled to one or more wheels 18 or any slidable element known in the art that facilitates movement of the mulch deck attachment 10.

Figure 3:
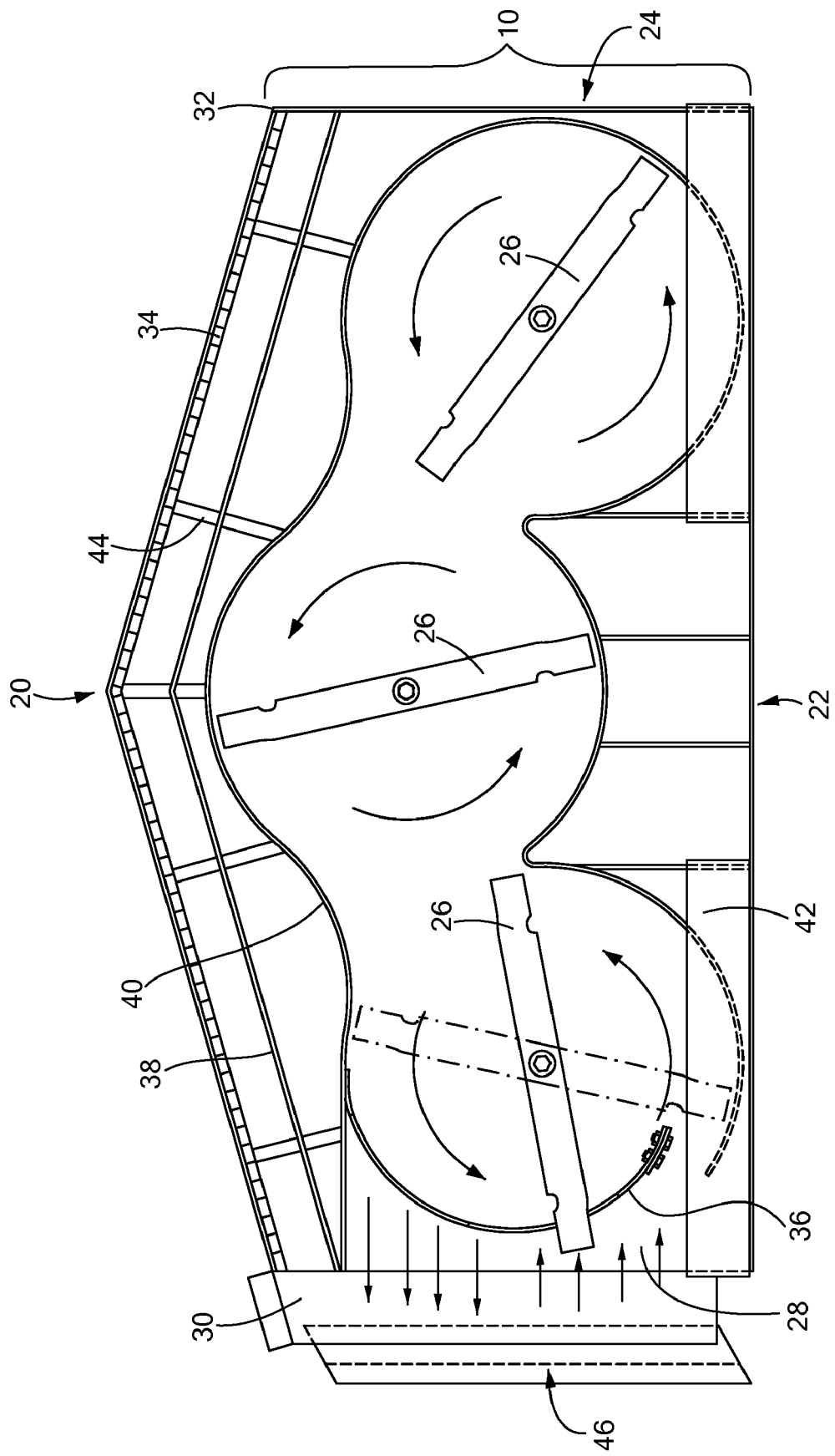
FIG. 3 is a bottom view of a multiple blade embodiment of the present invention.
Figure 4:
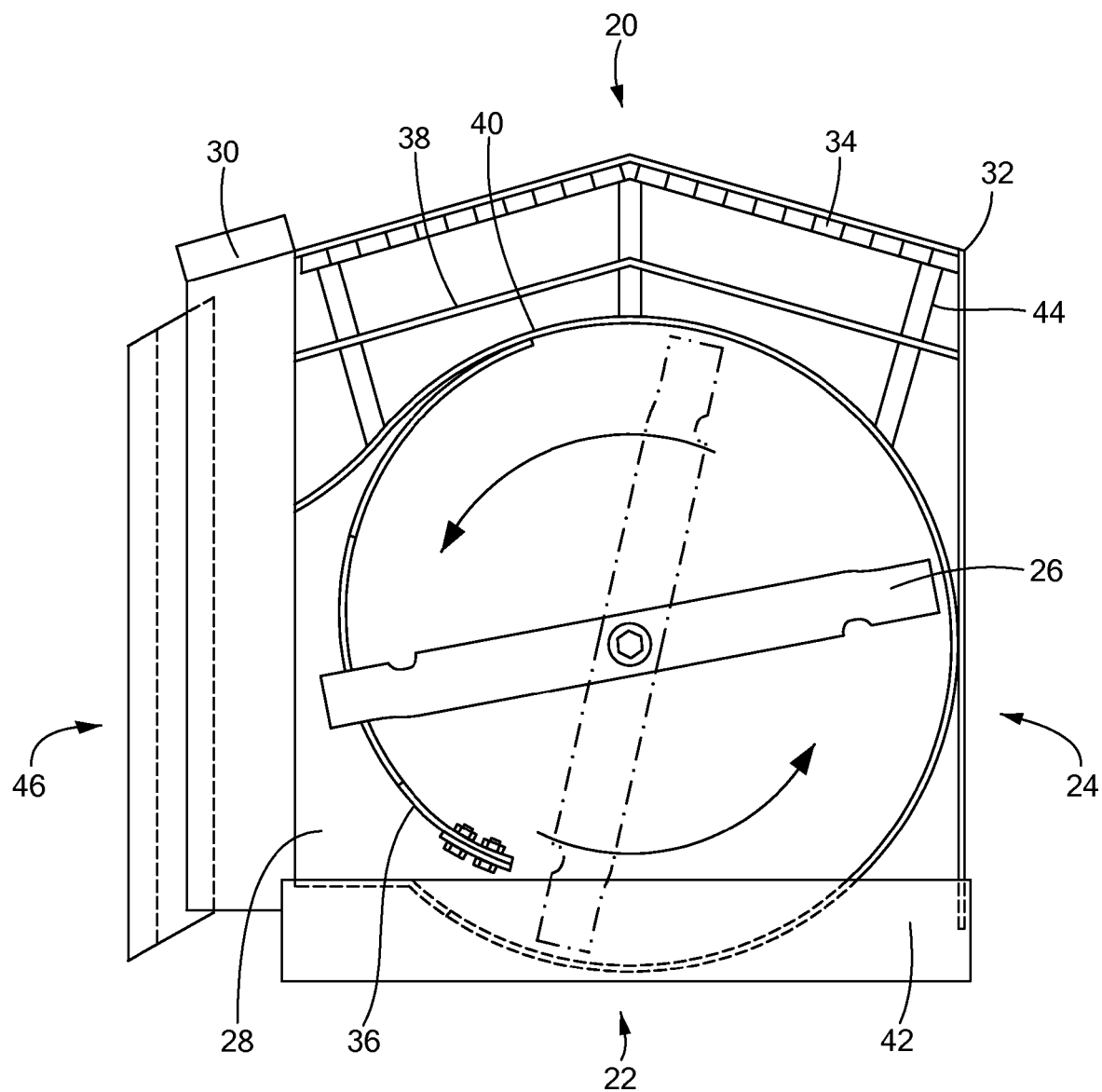
FIG. 4 is a bottom view of a single blade embodiment of the present invention.

FIG. 3 and FIG. 4 are bottom views of the mulch deck attachment 10 of the present invention. An embodiment of the present invention having multiple blades 26, typically for commercial use, is shown in FIG. 3 and an embodiment of the present invention having one blade 26, typically for home use, is shown in FIG. 4. The mulch deck attachment 10 may define a front portion 20, a rear portion 22 a side portion 24. The mulch deck attachment 10 may further include one or more rotating blades 26 coupled to mulch deck attachment 10. The blades 26 may be coupled to mulch deck attachment 10 by any attachment means known in the art including, but not limited to, screwing, bolting, welding or nailing the blades 26 to the mulch deck attachment 10 to enable the blades 26 to rotate freely when disposed within the mulch deck attachment 10. The blades 26 may be aerodynamic or high lift in design, such that when the lawnmower 12 is in operation, air is suctioned in through an opening 28 defined by the mulch deck attachment 10 and dispersed through a chute 30. The opening 28 may span, or substantially span a portion of the width of the mulch deck attachment 10. The chute 30 may be any structure capable directing the expulsion of grass clippings, rocks, and other debris from the mulch deck attachment 10 away from the mower operator.

Continuing to refer to FIG. 3 and FIG. 4, front portion 20 may define a leading edge 32. The leading edge 32 spans a length of the mulch deck attachment 10 and may define an angle at its midpoint, which may effectuate the mulch deck attachment 10 being more aerodynamic. The leading edge 32 may define a rake like set of slots 34 (best seen in FIG. 6) that depend downward from the leading edge 32 and facilitate the movement of grass into the mulch deck attachment 10. The rake like set of slots 34 may resemble a comb like structure with soft or rigid teeth and may have any number of teeth that depend downward from the leading edge 32. A distance between the teeth that defines the rake like set of slots 34 may be any distance sufficient to facilitate the movement of grass into the mulch deck attachment 10. As the mulch deck attachment 10 navigates over the grass to be cut, the grass passes through the rake like set of slots 34 into the path of the blades 26. The rake like set of slots 34 may inhibit the expulsion of dirt and debris out from the leading edge 32 while keeping a portion of the grass upright to be cut upright. This results in a more efficient cut and less friction in adverse conditions such as high grass, which may reduce the workload on the motor 14.

Continuing to refer to FIG. 3 and FIG. 4, the mulch deck attachment 10 includes a first baffle 36 coupled to the mulch deck attachment 10, the first baffle 36 being disposed within a turning radius defined by the blades 26. Alternatively, the first baffle 36 may be positioned proximate the opening 28 and may be disposed in a position such that part of the first baffle 36 may be disposed within the turning radius of the blades 26 and/or part of the first baffle 36 may be disposed about the turning radius of the blades 26. In alternative embodiments of the present invention, the first baffle 36 may be disposed in any position about the blades 26 that enables the first baffle 36 to channel clippings within the mulch deck attachment 10. The first baffle 36 may be coupled to the mower deck attachment 10 above the blades 26 via attachment mechanisms known in the art.

Continuing to refer to FIG. 3 and FIG. 4, one or more second baffles 38 may be coupled to mulch deck attachment 10 and disposed proximate to the front portion 20 and may be disposed between the first baffle 36 and the leading edge 32 and may further define an angle at its midpoint. The second baffle 38 may substantially span the front portion 20 of the mulch deck attachment 10 and may be substantially rectangular in shape and parallel to the leading edge 32 or alternatively may be curved or arcuate.

One or more third baffles 40 may be coupled to mulch deck attachment 10 and may be disposed about the turning radius defined by the blades 26. The third baffles 40 may be disposed proximate the front portion 20 and/or the rear portion 22. The third baffles 40 may be curved, straight, or arcuate.

One or more fourth baffles 42 may be coupled to the mulch deck attachment 10 proximate the rear portion 22. The fourth baffles 42 may be substantially rectangular in shape and may be partially disposed about the blades 26. The one or more fourth baffles 42 may be positioned beneath the blades 26 as to prevent air from being drawn in from the rear portion 22 and to further facilitate the re-circulation of clippings within the mulch deck attachment 10. The one or more fourth baffles may be adjustable or pivotable and may close off all or a portion of the rear portion 22.

Continuing to refer to FIG. 3 and FIG. 4, a buttressing element 44 may be coupled at one end to the leading edge 32 and at its other end to the third baffles 40 of the mulch deck attachment 10. The buttressing element 44 lends support to the mulch deck attachment 10 so that when in operation, the high pressure generated by the blades 26 may be resisted by the buttressing element 44 thereby preventing deformation of the second baffle 38 and the one or more third baffles 40. The buttressing element 44 may be a bracket or any other structure with sufficient strength to lend support to the mulch deck attachment 10.

Continuing to refer to FIG. 3 and FIG. 4, a flap 46 may be coupled to the mulch deck attachment 10 proximate the opening 28. The flap 46 may be pivotable and movable with respect to the opening 28. The flap 46 directs the expulsion of clippings from the mulch deck attachment 10. The flap 46 may be a rolled edge defined by the side portion 24, which spans a portion of the side portion 24 and facilitates the expulsion of clippings from the mulch deck attachment 10. The flap 46 may be positioned proximate the front portion 20 and may be disposed within chute 30. The chute 30 may be pivotable or adjustable and prevents rocks and other debris from being launched from the mulch deck attachment 10 in an uncontrolled manner. Furthermore, it is contemplated by the present invention that the opening 28 may be partially closed off by additional attachments to allow for further re-circulation clippings and to minimize any windrow formation.

Figure 5:
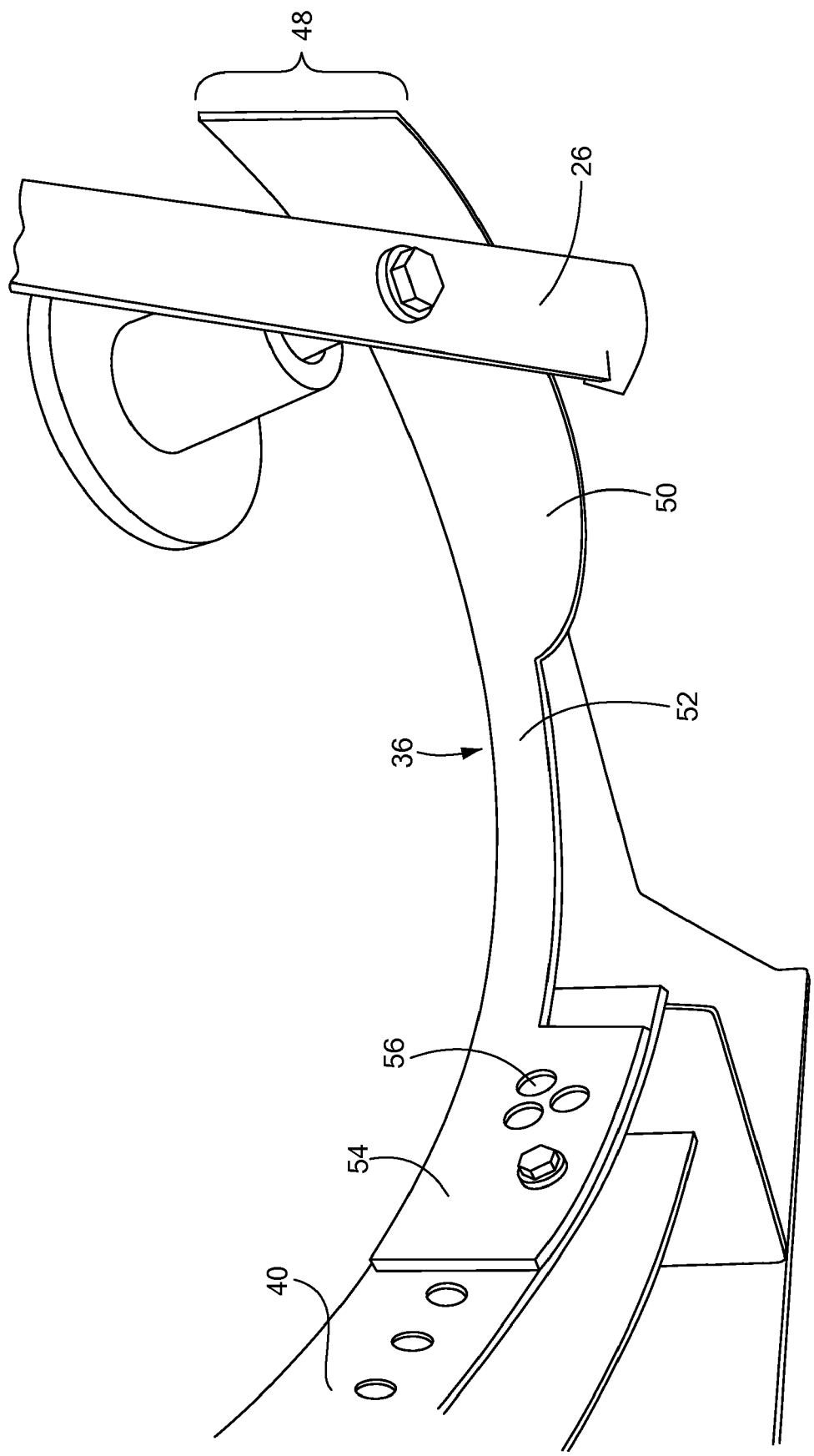
FIG. 5 is a perspective view of the first baffle in accordance with the principles of the present invention.

FIG. 5 depicts a perspective view of the first baffle 36 in accordance with the present invention. The first baffles 36 may define a body 48 having a first portion 50, a second portion 52, and a third portion 54. The body 48 may be curved, straight, or arcuate, and may be composed of any material capable of deflecting and channeling clippings being circulated at high velocities. In an embodiment of the present invention, the first portion 50 may be substantially rectangular in shape with a curved edge. A transverse width of the first portion 50 may be greater than a transverse width of the second portion 52. The first portion 50 may also be curved, straight, or arcuate. The second portion 52 acts as a span between the first portion 50 and the third portion 54 and may be substantially rectangular or be of any shape or size and may have a transverse width less than both the first portion 50 and the third portion 54. The length of the second portion 52 may be greater than a length of the first portion 50. The second portion 52 may be curved, straight, or arcuate, and may be partially disposed about a turning radius of the blades 26. The third portion 54 may be rectangular or any shape or size and may have a transverse width greater than both the first portion 50 and the second portion 52. The third portion 54 may also be curved, straight, or arcuate. The third portion 54 may further define one or more apertures 56, wherein the apertures 56 may be of and shape and size and be disposed at any angle to allow for the expulsion of clippings. In an embodiment of the present invention, the third portion 54 defines the apertures 56 at approximately a forty five degree angle from an axis created parallel to the blades 26. The apertures 56 may be angled to coincide with the direction of rotation of the blades 26 in order to expel clippings out through chute 30 or re-circulate the clippings back into the path of the blades 26.

Figure 6:
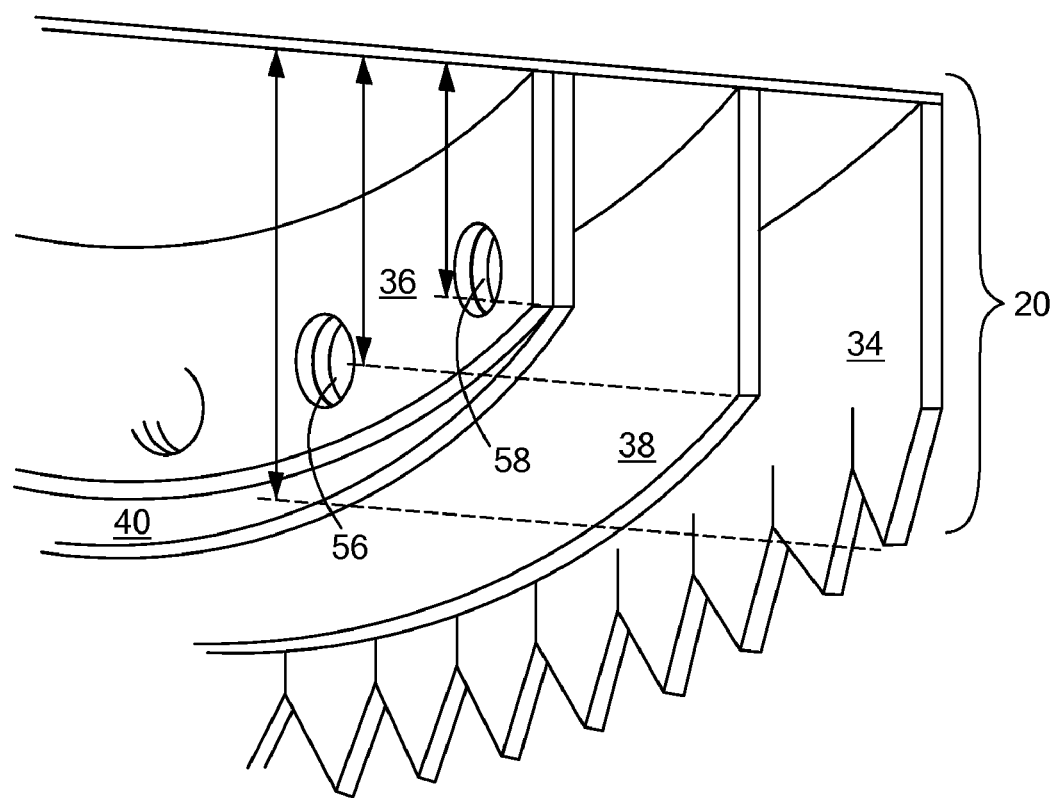
FIG. 6 is a prospective view of the front portion of the mulch deck attachment in accordance with the present invention.

FIG. 6 depicts a prospective view of the front portion of the mulch deck attachment 10 in accordance with the present invention. In one embodiment, a height of the second baffle 38 is less than a height of the rake like set of slots 34 and as a result may depend higher from the ground than the rake like set of slots 34. Because the second baffle 38 may be stepped up from the rake like set of slots 34, grass to be cut entering the mulch deck attachment 10 via the rake like set of slots 34 may remain upright when the blades 26 passes over the grass to be cut. Moreover, when grass clippings are expelled out through the first baffle 36, the clippings may be channeled toward the second baffle 38. When the clippings contact the second baffle 38, the larger clippings are channeled by the blades 26 about the second baffle 38 back into the path of the rotating blades 26, while the smaller clippings may either expelled out under the second baffle 38 or suctioned up by rotating blades 26. This stepped up configuration of the second baffle 38 relative the rake like set of slots 34 facilitates the reduction in size of clippings into tiny particles of mulch without clogging the mulch deck attachment 10. Third baffles 40 may further define a plurality of holes 58 to facilitate the expulsion of clippings and to abate the pressure build up created by the blades 26. In one embodiment of the present invention, the first baffle 36 and the third baffles 40 may positioned adjacent to each other such that the holes 58 are coextensive with the apertures 56 to create a tunnel for the clippings to be expelled out towards the second baffle 38.

Figure 7:
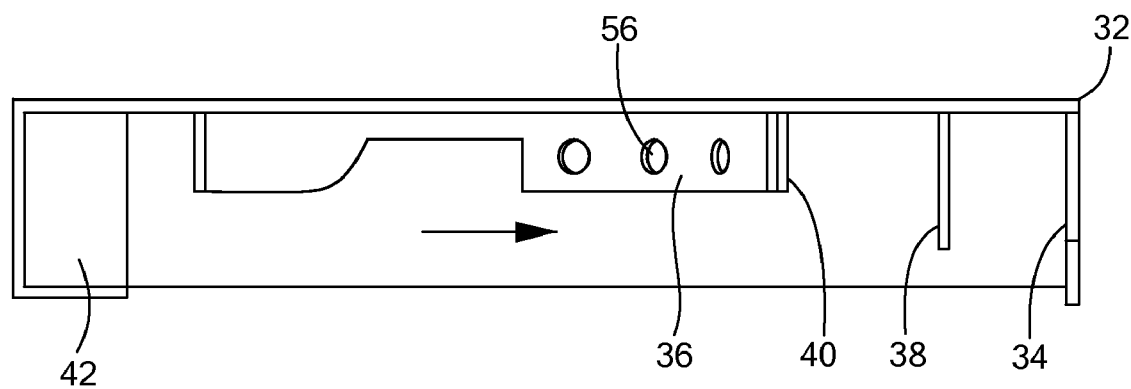
FIG. 7 is a side view of the baffle system as seen through a side opening in the mulch deck attachment in accordance with the present invention.

FIG. 7 depicts a side view of the baffle system as seen through the opening in the mulch deck attachment accordance with the present invention. In one embodiment of the present invention, a height of the third baffles 40 is less than the height of the second baffle 38 and also less than the height of the rake like set of slots 34. The variation in heights of the rake like set of slots 34, the second baffle 38, and the third baffles 40, operates to direct different particles sizes of clippings through mulch deck attachment 10. As an example, under some conditions, the smallest clippings are expelled out under the third baffles 40, and under the second baffle 38, while the larger clippings are trapped and re-circulated by the second baffle 38 or the third baffles 40 depending on the size of the clippings.

Figure 8:
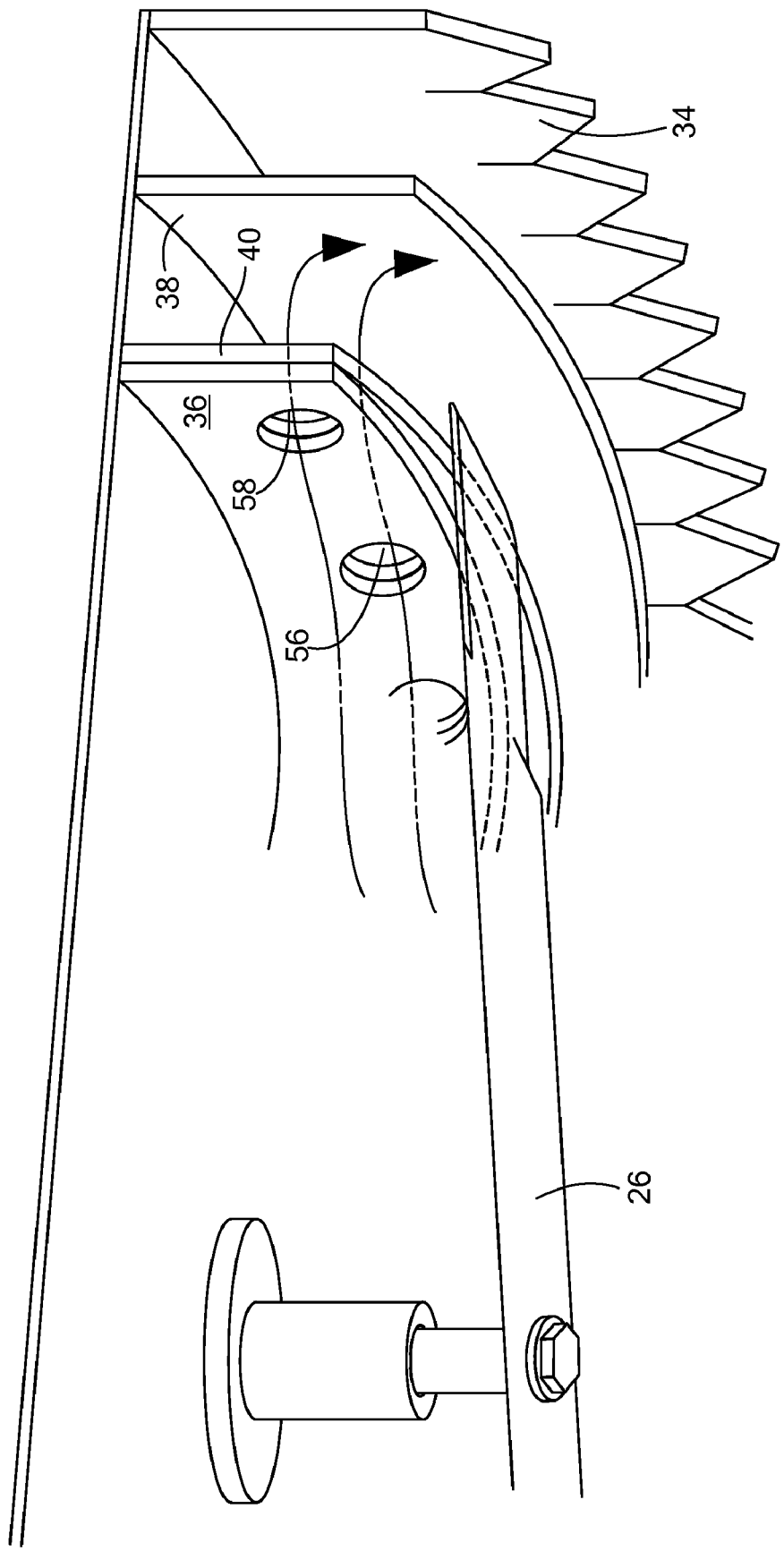
FIG. 8 is a cross sectional perspective view of the front portion of the mulch deck attachment in accordance with the present invention.

As shown in FIG. 8, which is a perspective cross sectional side view of the front portion of the mulch deck attachment, grass to be cut passes through the rake like set of slots 34. The blades 26 create high lift and pressure that elevate the grass to be cut and cooperate to create airflow within the mulch deck attachment 10. The clippings are the then propelled against the first baffle 36, and/or the third baffles 40, and follow air channels along the first baffle 36, or the third baffles 40, created by the rotating blades 26. A portion of the clippings is then propelled through the apertures 56, or the holes 58, which are aligned with the apertures 56, and contact the second baffle 38, where the clippings are dropped down to the ground as mulch and/or re-circulated up into the mulch deck attachment 10.

Other clippings flow along an air channel created along the baffles 40 until they are expelled out through the chute 30, or the clippings are mixed with other clippings and contact the third portion 54 of the first baffle 36. The clippings that are sufficiently small in size to enter the holes 58, and/or the apertures 56, are then propelled through the holes 58, and/or the apertures 56, where the clippings contact the second baffle 38. These clippings are then either re-circulated back into the path or the blades 26 via the second baffle 48 or they are circulated about the second baffle 38 and expelled out through chute 30. The smaller clippings may also pass under the second baffle 38 and may be drawn back up by the blades 26. The portion of the clippings that is too large to be expelled through the apertures 56, or the holes 58, may then be circulated about the second portion 52 of the first baffle 36. Because the second portion 52 is smaller in transverse width than the third portion 54, the smaller particles of clippings are then expelled out through the chute 30 or re-circulated back into the path of the blades 26. The larger clippings are then circulated past the first portion 50 and back into the path of the blades 26. The circulation of clippings is created as the blades 26 extend radially outward past the first portion 50 of the first baffle 36 creating an air channel proximate the opening 28.

The pressure created from the rotation of the blades 26 may cause clippings to circulate about the first baffle 36 in at least two airflow paths. The first airflow path is created by the blades 26 when they rotate under the first portion 50 of the first baffle 36. The blades 26 may extend approximately three to five inches past the first portion 50, forming high pressure proximate the opening 28. This high pressure causes clippings to circulate and contact the third baffles 40 and/or be expelled out through the chute 30. Alternatively, the second airflow path is created as the blades 26 rotate within the third portion 54 of first baffle 36, raising pressure distal to the opening 28.

Figure 9:
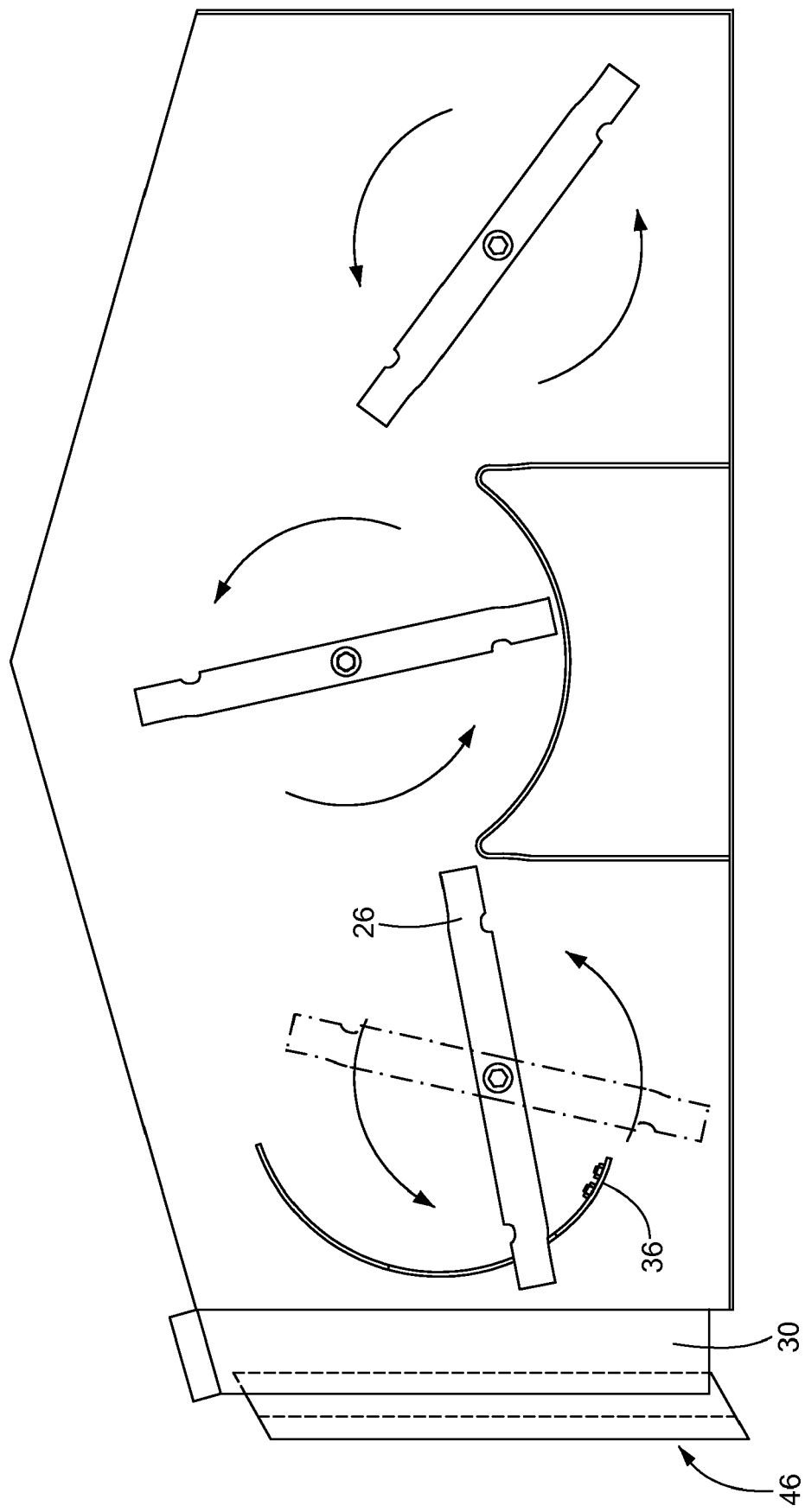
FIG. 9 is a bottom view of a multiple blade embodiment of the present invention showing the first baffle.

Now referring to FIG. 9, a bottom view of an alternative system of the present invention can be seen. The mulch deck attachment 10 may operate as described above with only a first baffle 36 and the blades 26 in the mulch deck attachment 10, without any other baffles. Alternatively, the above system may operate with one blade 26 for smaller lawnmowers 12.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A lawn mower deck attachment, comprising:
   a mulch deck defining a front portion, a rear portion, and an opening;
   one or more rotating blades coupled to the mulch deck, each of the one or more rotating blades defining a turning radius;
   a first baffle coupled to the mulch deck, the first baffle defining a plurality of apertures sized to allow for expulsion of grass clippings, the first baffle disposed such that a first portion of the first baffle is disposed within the turning radius defined by one of the one or more rotating blades and a second portion of the first baffle is disposed outside the turning radius defined by one of the one or more rotating blades; and
   a second baffle separate and discrete from the first baffle, the second baffle coupled to the mulch deck disposed between the leading edge and the first baffle.

2. The lawn mower deck attachment of claim 1, further including a third baffle separate and discrete from the second baffle, the third baffle coupled to the mulch deck and disposed such that a first portion of the third baffle is disposed within the turning radius defined by one of the one or more rotating blades and a second portion of the third baffle is disposed outside the turning radius defined by one of the one or more the rotating blades.

3. The lawn mower deck attachment of claim 2, wherein a height of the third baffle is less than a height of the second baffle.

4. The lawn mower deck attachment of claim 3, wherein the height of the second baffle is less than a height of the rake like set of slots, such that the rake like set of slots, the second baffle, and the third baffle are arranged in a stepped configuration in order to direct different particle sizes of clippings through the mower deck attachment.

5. A baffle system for use in a lawn mower deck attachment, the lawn mower deck attachment having one or more rotating blades, the baffle system comprising:
   a mulch deck coupled to the one or more rotating blades, the mulch deck defining a front portion, a rear portion, and an opening;
   a first baffle coupled to the mulch deck, the first baffle defining a plurality of apertures sized to allow for expulsion of grass clippings, the first baffle disposed such that a first part of the first baffle is disposed within the turning radius defined by one of the one or more rotating blades and a second part of the first baffle is disposed outside the turning radius defined by one of the one or more rotating blades;
   a second baffle separate and discrete from the first baffle, the second baffle coupled to the mulch deck, the second baffle being disposed proximate the front portion of the mulch deck;
   a third baffle separate and discrete from the second baffle, the third baffle coupled to the mulch deck and disposed such that a first part of the third baffle is disposed within the turning radius defined by one of the one or more rotating blades and a second part of the third baffle is disposed outside the turning radius defined by one of the one or more the rotating blades, the third baffle defining a plurality of holes, the third baffle being disposed between the first and second baffles.

6. The baffle system of claim 5, wherein a height of the third baffle is less than a height of the second baffle.

7. The baffle system of claim 5, wherein the first baffle and the third baffle are positioned such that the plurality of apertures and the plurality of holes are coextensive.

* * * * *